United States Patent [19]

dePaz et al.

[11] Patent Number: 4,891,157

[45] Date of Patent: Jan. 2, 1990

[54] PARTIAL OXIDATION PROCESS

[75] Inventors: Enrique F. dePaz, Poughkeepsie; Roger J. Corbeels, Wappingers Falls; Charles G. Sengenberger, Hopewell Junction, all of N.Y.

[73] Assignee: Texaco Inc., White Plains, N.Y.

[21] Appl. No.: 292,710

[22] Filed: Jan. 3, 1989

[51] Int. Cl.$^4$ .............................. C01B 3/36; C01B 3/02
[52] U.S. Cl. .................................... 252/373; 48/197 R
[58] Field of Search ....................... 252/373; 48/197 R

[56] References Cited

U.S. PATENT DOCUMENTS 3,097,081  2/1963  Eastman et al. ............... 252/373 X
3,607,157  9/1971  Schlinger et al. ................... 48/206

*Primary Examiner*—Howard T. Mars
*Attorney, Agent, or Firm*—Robert A. Kulason; James J. O'Loughlin; Albert Brent

[57] ABSTRACT

The hot effluent gas stream comprising $H_2+CO$ and entrained molten slag from the partial oxidation of an ash-containing heavy liquid hydrocarbonaceous fuel, an ash-containing solid carbonaceous fuel, or mixtures thereof is passed in succession through a radiant or quench cooling zone, a metal gas transfer line and a convective cooling zone. By covering the metal surfaces of the gas transfer line or the gas transfer line and the convective cooler connected thereto with a high temperature resistant carbon-containing material, substantially no molten slag sticks to the metal heat transfer surfaces on the inside of the gas transfer line or to the surfaces of the gas transfer line and the convective cooler connected thereto which are contacted by the partially cooled gas stream leaving the radiant or quench cooling zones.

9 Claims, No Drawings

PARTIAL OXIDATION PROCESS

FIELD OF THE INVENTION

This invention relates to a process for the partial oxidation of an ash-containing heavy liquid hydrocarbonaceous, an ash-containing solid carbonaceous fuel, or mixtures thereof to produce an effluent gas stream comprising $H_2+CO$ and entrained molten slag at a temperature in the range of about 2000° F. to 3000° F. More specifically it pertains to preventing slag deposits in equipment downstream of the reaction zone by preventing molten slag entrained in the effluent gas stream from sticking to the inside surfaces of a downstream gas transfer line or a gas transfer and a connecting convective cooler.

BACKGROUND OF THE INVENTION

The partial oxidation process is a well known process for converting liquid hydrocarbonaceous and solid carbonaceous fuels into synthesis gas, reducing gas, and fuel gas i.e. gaseous mixtures comprising $H_2+CO$. See coassigned U.S. Pat. Nos. 3,988,609 and 4,251,228 for example, which are incorporated herein by reference.

Ash-containing heavy liquid hydrocarbonaceous fuels i.e. coal derived oil, and ash-containing solid carbonaceous fuels i.e. coal are desirable low-cost feedstocks for the partial oxidation process. However, when these fuels are used, the hot effluent gas stream from the reaction zone contains entrained molten slag. In some cases some of the molten slag entrained in the effluent gas stream may deposit on the inside metal surfaces of a gas transfer line or a gas transfer line and a convective cooler connected thereto and located downstream of the reaction zone. Over a period of time, the build-up of these deposits, may lead to reduced efficiency and/or operating difficulties. This problem and others may be avoided by the subject process thereby resulting in reduced downtime and lower maintenance costs.

SUMMARY OF THE INVENTION

In accordance with certain aspects of the invention there is provided a process for the partial oxidation of an ash-containing heavy liquid hydrocarbonaceous fuel, an ashcontaining solid carbonaceous fuel, or mixtures thereof to produce an effluent gas stream having a temperature in the range of about 2000° F. to 3000° F. and comprising $H_2+CO$ and entrained molten slag; and cooling said effluent gas stream in a cooling zone comprising a radiant or quench cooler located down-stream from said reaction zone; wherein said molten slag is prevented from sticking to the internal surfaces of any gas transfer line connecting said radiant or quench cooler with a convective cooler or depositing in said gas transfer line and said convective cooler by covering the internal surfaces of said gas transfer line or said gas transfer line and said convective cooler with a high temperature carbon-containing material. The high temperature carbon-containing material is selected from the group consisting of carbon, graphite, coal and/or petroleum coke based materials, and mixtures thereof. They contain from about 20 to 100 wt. % of carbon. The remainder of the material may be ash or a high temperature resistant resin binder, such as epoxy resin. They may be in the form of bricks, tiles, conduit, preformed shapes, film and paste coatings, fiber mat and fabric, and epoxy-graphite fiber laminates, and combinations thereof.

DESCRIPTION OF THE INVENTION

Ash-containing liquid hydrocarbonaceous and/or solid carbonaceous fuel are reacted with a free-oxygen containing gas e.g. air, oxygen-enriched air, substantially pure oxygen, with or without a temperature moderator e.g. $H_2O$, $CO_2$, $N_2$ in a refractory lined partial oxidation synthesis gas generation zone. The partial oxidation reaction takes place in a reducing atmosphere at a temperature in the range of about 2000° F. to 3000° F., such as about 2200° F. to 2600° F; and a pressure in the range of about 5 to 250 atmospheres, such as about 15 to 200 atmospheres. When steam or water is used as a temperature moderator, the $H_2O$/fuel weight ratio is in the range of about 0.1 to 5.0, such as about 0.2 to 0.9. The atomic ratio of free oxygen to carbon in the fuel (O/C ratio) is in the range of about 0.6 to 1.6, such as about 0.8 to 1.4.

The term ash-containing liquid hydrocarbonaceous material or fuel feed to the partial oxidation process is by definition a fuel selected from the group consisting of tar sands bitumen, coal tar, shale oil, coal derived oil, and mixtures thereof.

The term ash-containing solid carbonaceous material or fuel feed to the partial oxidation process is by definition coal including anthracite, bituminous, sub-bituminous, and lignite; coke from coal, coal liquefication solid residue; and mixtures thereof.

The preferable particle size of the comminuted solid carbonaceous fuel is such that substantially all e.g. about 95 wt. % or more of the material passes through a sieve of the size in the range of ASTM E-11 Standard Sieve Designation about 425 μm to 38 μm, or below. The ground fuel or fuel mixture may then be introduced into the partial oxidation reactor or mixed with water to produce a pumpable slurry. Alternatively, the solid fuel may also be wet ground directly with the liquid medium to form the slurry directly. Slurries of solid fuel having a solids content in the range of about 50 to 68 wt. % are then introduced into a partial oxidation gasifier.

The composition of the hot, raw effluent gas stream directly leaving the reaction zone of the free-flow partial oxidation gas generator is about as follows, in mole percent: $H_2$ 10 to 70, CO 15 to 57, $CO_2$ 0.1 to 25, $H_2O$ 0.1 to 20, $CH_4$ nil to 60, $H_2S$ nil to 2, COS nil to 0.1, $N_2$ nil to 60, and Ar nil to 2.0. Particulate carbon is present in the range of about 0.2 to 20 weight % (basis carbon content in the feed). Molten slag is present in the range of about 0.5 to 15.0 wt. %, (basis total weight of fuel feed). The synthesis gas may be produced in a vertical free-flow unobstructed partial oxidation reaction zone, such as that shown and described in coassigned U.S. Pat. No. 3,607,157, which is incorporated herein by reference. Slag is the product of the melted mineral matter in the fuel. If the molten slag entrained in the hot raw effluent gas stream comprising $H_2+CO$ contains significant amounts of low melting species, these may cause agglomeration of the non-molten slag particles. In other words, the melted phases act as a glue to bind slag particles together and against the inner surfaces of equipment downstream of the gasifier such as in the cooling zone and/or the gas transfer lines. If the gasifier is run long enough, this situation may result in a large enough build-up to disrupt normal operations and ultimately cause premature shut down of the system.

The hot raw process gas stream passes down through the vertical free-flow refractory lined partial oxidation reaction zone carrying entrained molten slag, and particulate matter i.e. soot and char. Soot is carbon produced by the partial oxidation of liquid hydrocarbon fuel. Char is devolatilized and partially combusted solid carbonaceous fuel particles comprising ash and carbon. The effluent gas stream leaves the reaction zone by way of an outlet somewhere in the reaction vessel. For example, the outlet may be in the upper or lower portions of the reaction zone.

In one embodiment, the temperature of the effluent gas stream is partially reduced to a temperature in the range of about 1000° F. to 1500° F. by passing the gas stream through an aligned vertical radiant cooler zone located below the reaction zone. The radiant cooler may comprise at least one ring of vertical water cooled tubes, such as shown and described in coassigned U.S. Pat. Nos. 4,310,333 and 4,377,132, which are incorporated herein by reference. About 50 to 80 wt. % of the molten slag and particulate matter drop out of the gas stream and are quenched in a water bath located below the radiant cooling zone and usually in the same vessel. Quench water containing particles of solid slag and particulate matter is removed periodically by means of a conventional lock hopper such as shown and described in coassigned U.S. Pat. No. 4,533,363, which is incorporated herein by reference. This slurry is replaced by fresh water.

Partially cooled raw synthesis gas, reducing gas, or fuel gas, depending on the gas analysis, leaves the radiant cooler by way of an outlet in the radiant cooler at a temperature in the range of about 932° F. to 1500° F. The gas stream then passes through a gas transfer line which connects to a convection cooler. Any suitable convection cooler may be used. For example, see coassigned U.S. Pat. Nos. 4,462,339 and 4,488,513, which are incorporated herein by reference. The temperature of the gas stream is reduced further in the convection cooler i.e., to a temperature in the range of about 350° F. to 750° F., by noncontact heat exchange with boiler feed water. The cooled gas may be then scrubbed by means of a conventional gas scrubber, such as shown and described in coassigned U.S. Pat. No. 4,559,061, which is incorporated herein by reference.

In another embodiment, the hot raw effluent gas stream leaves the partial oxidation gasifier by way of a central axially aligned outlet in the bottom of the partial oxidation gasifier. The hot raw effluent gas stream is then passed through a quench water distribution ring and dip tube in a quench tank located immediately below the gasifier. The dip-tube discharges the hot raw effluent gas stream below the water level of a pool of quench water contained in the bottom of the quench tank. By this means the gas stream is scrubbed with water and a large portion of the slag is removed. Further, the gas stream is cooled to a temperature in the range of about 350° F. to 500° F. A typical quench tank is shown in coassigned U.S. Pat. No. 4,447,584, which is incorporated herein by reference. In still another embodiment, the quenched gas stream leaving the quench tank is passed through a gas transfer line and a convection cooler attached thereof. The inside metal walls of the gas transfer line and the convection cooler, and the outside surfaces of the metal cooling tubes in the convection cooler that are contacted by the gas stream may be covered with a baked on epoxy-graphite coating material to prevent slag sticking and build-up.

Molten slag entrained in the effluent gas stream may deposit on and stick to the inside metal walls of gas transfer lines and the convective cooler, and on the outside of the heat exchange tubes in the convective cooler. Over a period of time, the build-up of these deposits on said surfaces are such that the gas can no longer pass through the gas transfer lines and/or heat transfer in the convective cooler is significantly reduced. These conditions will lead to loss of efficiency and/or to unit shutdown. The sticking phenomenon involves transfer of the molten slag and ash particles to the metal duct walls, adherence of the particles to the metal walls, and the subsequent sintering (partial melting) of the deposited particles to form a hard, strong, and fused mass. The deposit generally is strong enough to resist removal by a normal on line removal method, such as soot blowing.

By the subject invention, substantially no molten slag, ash, or mixtures thereof deposits out and sticks to the inside metal walls of the gas transfer line. Depending on whether radiant cooling or quench cooling is employed, the temperature of the gas stream entering the gas transfer line may be in the range of about 350° F. to 1500° F. The temperature drop of the effluent gas stream passing through the gas transfer line is in the range of about 10° to 100°

Whether or not deposition occurs depends on among other things, the gas, particle and surface temperatures, and the geometry of the system. However, for adhesion to occur there must also be chemical compatibility between the particles and the surface. This means that the semi-liquid (sticky) slag particles must wet and/or chemically interact with the surface. By the subject invention, areas where deposits may occur are covered with a high temperature carbon-containing material which is not wetted by nor reacts with the semi-liquid slag particles. Carbon, graphite, coal and/or petroleum coke based materials, and mixtures thereof are such materials. They contain about 20 to 100 wt. % of carbon. The remainder of the material may be ash or a high temperature resistant resin binder, such as epoxy resin. Although these products will oxidize rapidly in high temperature combustion systems due to the excess oxygen present in the combustion gases, they are quite durable and effective in the reducing gas atmospheres found in the subject partial oxidation gasifiers. The carbon-containing materials to be used may be in the form of bricks and tiles about ¼" to 2" thick, conduit, preformed shapes, fiber mat and fabric, film or paste type coatings, epoxy-graphite fiber laminate, and combinations thereof. Selection of the material will depend on the operating conditions and the desired product characteristics. For example, in gas transfer lines where high velocity slag impaction and abrasion may occur, a high density carbon or graphite brick, tile, or conduit may be selected. Where abrasion may be of no concern, such as in large heat transfer vessels a film or thin paste coating about 0.001 to 0.010 inches thick will be sufficient.

The following examples illustrate preferred embodiments of this invention. However, the examples should not be construed as limiting the scope of the invention.

EXAMPLE 1

The gas stream comprising $H_2 + CO$ exits from the partial oxidation gasification vessel at a temperature of 2300°–2350° F. This stream also contains the molten slag formed from the original mineral matter present in the gasification feed. This stream is cooled by first passing it downward through a large diameter vertical steel pressure vessel containing a metal water wall lined radiant cooler. The partially cooled gas stream is than passed through a comparatively smaller diameter steel gas transfer duct lined with a high density abrasion resistant graphite tile such as product HDG, manufactured by Fiber Materials, Inc. Finally, the gas stream is passed through a vertical convective cooler comprising a large diameter vessel with a series of tube banks, or it may be directly contacted with water. The radiant cooler reduces the temperature of the gas stream to about 1200°-1350° F. The design at the bottom of the radiant vessel is such that it forces the gas stream to make a sudden change in direction (90° to 180°). While the gas stream can change directions suddenly, most of the slag particles, due to their momentum cannot and therefore continue in a straight line until they impinge and are trapped in a water pool at the bottom of the vessel. The water cools and solidifies the molten slag particles, after which, they are removed from the process through a lockhopper system. Although this method generally separates 80-90 wt. % of the total slag from the gas, very small slag particles (<10 microns) will follow the gas stream lines and will not separate at the bottom of the radiant vessel and be carried into the transfer line. If these particles are still partially molten at the 1200°-1350° F. gas temperatures, and the internal surface of the gas transfer line is made of a material e.g. steel which will be wetted by the molten phases in the particles, and/or which chemically interacts with the molten slag, then the high velocities (20-60 ft/sec) and turbulence in the transfer line will cause the particles to impinge, settle and stick to the internal surface of the duct. Due to chemical compatibility, subsequent particles are rapidly trapped on the surface of the initial deposited layer. After extended operation, this build-up will ultimately lead to plugging of the gas transfer line and premature shutdown of the process. It was found that carbon based materials, such as the HDG product used in this example were chemically incompatible and were not wetted by the molten oxides which generally comprise gasification slags. Therefore, this lining prevented stickage of the initial particles, thus preventing deposit buildup and allowing extended operation of the process. The high density graphite product was especially selected in this application for covering the inside surfaces of the gas transfer line over other carbon products such as thin films or pastes, because of its resistance to the abrasion conditions which are present in the gas transfer duct due to the high particle velocities (20-60 ft/sec) in the transfer duct. Graphite filled epoxy resin coatings such as described in Example 2 are better suited for covering the inside metal walls and metal heat exchange tubes of the convective coolers.

HDG tile is an isotropic fine grain high density graphite with exceptional mechanical properties. The tiles are processed at high pressure and temperature in a hot isostatic press. The following are typical mechanical and thermal properties of the HDG material.

| | |
|---|---|
| Density, lbs/ft$^3$ | 122 |
| Tensile Strength, psi | 6,500 |
| Tensile Modulus, 10$^6$ psi | 2.5 |
| Strain to Failure, % | 1.05 |
| Compressive Strength, psi | 19,200 |
| Flexural Strength, psi | 12,100 |

| -continued | |
|---|---|
| Thermal Conductivity at 1000° F., BTU in/h · ft$^2$ · F | 439 |
| Coefficient of Thermal Expansion at 1000° F. F$^{-1}$ (C) × 10$^{-6}$ | 3.2 |
| Open Porosity | 0.2 |
| Wt. % Carbon | 99.7 |

EXAMPLE 2

This application of the invention is related to a process such as in Example 1. The hot effluent gas stream leaving the partial oxidation gas generator is passed through a radiant cooler, a gas transfer duct, and is cooled from 1200°-1350° F. to 400°-500° F. in a convective cooler. Since little or no cooling occurs in the gas transfer line, the remaining molten slag particles can still deposit on the inside of the vessel walls and on the surface of the tubes comprising the heat exchange surfaces in the convective cooler. Because the cross-section of this vessel is very large compared to the gas transfer line, there is little chance of it plugging with deposits. However, slags have a very low thermal conductivity and thus are good insulators. Because of this property, any deposits that form on the convective cooler heat transfer surfaces will reduce heat recovery and overall process efficiency. To prevent slag deposition, the heat exchange surfaces and the vessel walls on the inside are coated with a carbon based material. These materials have a significantly higher thermal conductivity than slag and the coating will therefore have no effect on overall heat recovery. Because the velocities through the vessel are also very low compared to the transfer duct (1-5 ft/sec versus 20-60 ft/sec), the carbon product need not be as abrasion resistant as that in the duct. Thus, for this application a film type coating such as product LS 1181, manufactured by Graphite Products, Co., will provide adequate protection against slag deposition.

LS 1181 is a graphite powder filled epoxy resin coating having a solids content of about 28 wt. %. It has a viscosity of 21±2 sec±4 Ford Cup, a specific gravity of 8 pounds per gallon, and a flash point of 100° F. C.O.C. It may be spray coated with an air pressure of 25-40 psi to a film thickness of about 0.001 inch to 0.010 inches. Suitable thinners are xylene and ethyl-3-ethoxypropionate. The coating is air dried for 30 minutes and baked at 350° F. to 400° F. for 20-30 minutes.

The process of the invention has been described generally and by examples with reference to materials for purposes of clarity and illustration only. It will be apparent to those skilled in the art from the foregoing that various modifications of the process and materials disclosed wherein can be made without departure from the spirit of the invention.

We claim:

1. A process for the partial oxidation of an ash-containing heavy liquid hydrocarbonaceous fuel, an ash-containing solid carbonaceous fuel, or mixtures thereof comprising: reacting said fuel with a free-oxygen containing gas and optionally with a temperature moderator to produce an effluent gas stream having a temperature in the range of about 2000° F. to 3000° F. and comprising $H_2+CO$ and entrained molten slag; and cooling said effluent gas stream to a temperature in the range of about 350° F. to 1500° F. in a radiant or quench cooling zone located down-stream from said reaction zone; wherein said molten slag is prevented from sticking to the internal metal surfaces of a gas transfer line or a gas transfer line and a convective cooler connected thereto and which surfaces are contacted by the partially cooled gas stream leaving said radiant or quench cooling zone by covering said metal surfaces of the gas transfer line or the gas transfer line and said convective cooler with a high temperature carbon-containing material.

2. The process of claim 1 wherein said high temperature carbon-containing material is selected from the group consisting of carbon, graphite, coal or petroleum coke based product, and mixtures thereof.

3. The process of claim 2 wherein said high temperature carbon-containing material is in the form of bricks, tiles, fiber mats and fabric, film or paste coatings, conduit, preformed shapes, epoxy-graphite fiber laminate, and combinations thereof.

4. The process of claim 1 wherein said high temperature carbon-containing material comprises about 20 to 100 weight percent of carbon.

5. The process of claim 1 wherein the temperature of the gas stream leaving said radiant or quench cooling zone is in the range of 350° F. about 1500° F.

6. The process of claim 1 wherein said ash-containing solid carbonaceous fuel is selected from the group consisting of coal, coke from coal, and mixtures thereof.

7. The process of claim 1 wherein said ash-containing heavy liquid hydrocarbonaceous fuel is selected from the group consisting of coal tar, coal derived oil, shale oil, tar sand oil, and mixtures thereof.

8. The process of claim 1 wherein said radiant and convective coolers comprise metal cooling tubes in a steel pressure vessel.

9. The process of claim 1 wherein said high temperature carbon-containing material comprises a graphite filled epoxy resin.

* * * * *